US007617232B2

(12) United States Patent
Gabbert et al.

(10) Patent No.: US 7,617,232 B2
(45) Date of Patent: Nov. 10, 2009

(54) CENTRALIZED TERMINOLOGY AND GLOSSARY DEVELOPMENT

(75) Inventors: Charles Keith Gabbert, Redmond, WA (US); Mark Wayne Robbins, Tacoma, WA (US); Robin J. Lombard, Shoreline, WA (US); Thomas Michael Woolums, Lynnwood, WA (US); Corneliu Moiceanu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/933,187

(22) Filed: Sep. 2, 2004

(65) Prior Publication Data

US 2006/0047689 A1 Mar. 2, 2006

(51) Int. Cl.
*G06F 17/30* (2006.01)
(52) U.S. Cl. .................... 707/102; 707/10; 707/204
(58) Field of Classification Search .......... 707/2, 707/3, 7, 10, 101, 102, 104.1; 715/513, 531, 715/532, 533
See application file for complete search history.

(56) References Cited

U.S. PATENT DOCUMENTS

| | | | | |
|---|---|---|---|---|
| 5,404,507 A | * | 4/1995 | Bohm et al. | 707/4 |
| 5,423,032 A | * | 6/1995 | Byrd et al. | 707/5 |
| 5,548,506 A | * | 8/1996 | Srinivasan | 705/8 |
| 5,551,049 A | * | 8/1996 | Kaplan et al. | 715/206 |
| 5,765,140 A | * | 6/1998 | Knudson et al. | 705/9 |
| 5,826,252 A | | 10/1998 | Wolters, Jr. et al. | |
| 5,850,561 A | * | 12/1998 | Church et al. | 715/532 |
| 6,161,113 A | * | 12/2000 | Mora et al. | 715/505 |
| 6,236,958 B1 | | 5/2001 | Lange et al. | |
| 6,308,164 B1 | * | 10/2001 | Nummelin et al. | 705/9 |
| 6,381,610 B1 | | 4/2002 | Gundewar et al. | |
| 6,411,962 B1 | * | 6/2002 | Kupiec | 707/102 |
| 6,529,911 B1 | | 3/2003 | Mielenhausen | |
| 6,678,698 B2 | * | 1/2004 | Fredell et al. | 707/104.1 |
| 6,708,311 B1 | * | 3/2004 | Berstis | 715/533 |
| 6,721,726 B1 | | 4/2004 | Swaminathan et al. | |
| 6,785,869 B1 | * | 8/2004 | Berstis | 715/210 |
| 6,842,760 B1 | * | 1/2005 | Dorgan et al. | 707/104.1 |
| 6,859,768 B1 | * | 2/2005 | Wakelam et al. | 703/1 |
| 6,895,407 B2 | * | 5/2005 | Romer et al. | 707/104.1 |
| 6,970,861 B2 | * | 11/2005 | Messler | 707/3 |
| 7,177,879 B2 | * | 2/2007 | Flank et al. | 707/104.1 |
| 7,191,141 B2 | * | 3/2007 | Motoyama | 705/7 |
| 7,212,987 B2 | | 5/2007 | Swanke et | |

(Continued)

OTHER PUBLICATIONS

Granda et al., "Terminology Management as Data Management," Proceedings of the 2001 Conference of the Centre for Advanced Studies on Collaborative Research, 2001, 4 pages, IBM Press, Canada.

(Continued)

*Primary Examiner*—Shahid A Alam
*Assistant Examiner*—Jacques Veillard
(74) *Attorney, Agent, or Firm*—Senniger Powers LLP

(57) ABSTRACT

Developing terminology for use within an organization. Data representing a term is received from a user. Data representing one or more projects to be associated with the term is also received from the user. The received data representing the term is linked with the received data representing the one or more projects in a memory area. A glossary for the one or more projects is generated. The generated glossary includes the term.

31 Claims, 14 Drawing Sheets

U.S. PATENT DOCUMENTS

| | | | |
|---|---|---|---|
| 7,296,229 B2 * | 11/2007 | Berstis | 715/259 |
| 7,363,305 B2 * | 4/2008 | Gabbert et al. | 707/8 |
| 2003/0163784 A1 | 8/2003 | Daniel et al. | |
| 2004/0002887 A1 | 1/2004 | Fliess et al. | |
| 2004/0243432 A1 | 12/2004 | Kelly et al. | |
| 2005/0027566 A1 * | 2/2005 | Haskell | 705/2 |
| 2005/0075858 A1 * | 4/2005 | Pournasseh et al. | 704/2 |
| 2005/0080792 A1 * | 4/2005 | Ghatare | 707/100 |

OTHER PUBLICATIONS

Brucker et al., "Nudging A Global Glossary to the New Millennium," Proceedings of the 16th Annual International Conference on Computer Documentation, 1998, pp. 158-163, ACM Press, New York, U.S.A.

Caldwell et al., "CogentHelp: A Tool for Authoring Dynamically Generated Help for Java GUIs," Proceedings of the 15th Annual International Conference on Computer Documentation, 1997, pp. 17-22, ACM Press, New York, U.S.A.

Kantner et al., "Designing a WinHelp Project For Quick Conversion To Lowest-Common-Denominator HTML-Based Help: A Case Study," Proceedings of the 16th Annual International Conference on Computer Documentation, 1998, pp. 214-218, ACM Press, New York, U.S.A.

"BC—Terminology and Glossary (SAPterm)," Release 4.6, Dec. 1999, 27 pages.

"ComponentOne Doc-To-Help," printed from http://www.componentone.com/products.aspx?ProductCode=1&ProductID=121, printed on Jun. 14, 2004, 2 pages.

"Macromedia ROBOHELPX5," printed on Sep. 2, 2004, 2 pages.

"STAR TermStar," printed from http://star-group.net/eng/software/sprachtech/termstar.html, Nov. 3, 2003, 1 page.

"Term Workstation," 2003, 2 pages.

"Term Server," 2003, 2 pages.

"TRADOS MultiTerm Server," printed from http://www.tradow.com/products.asp?page=57, printed on Aug. 25, 2004, 2 pages.

"Term Anywhere," printed from http://www.trados.com/products.asp?page=54, printed on Aug. 25, 2004, 2 pages.

"Term Extract Module," printed from http://www.trados.com/products.asp?page=55, printed on Aug. 25, 2004, 2 pages.

TRADOS MultiTerm Terminology Solutions, Technical White Paper, printed on Sep. 2, 2004, 12 pages.

* cited by examiner

FIG. 5A

Glossary Lookup

Configure Startup Profile

Product  Digital Media
Group    Media
Project  Media Foundation          Modify

Current Selections

Product  Digital Media
Group    Media
Project  Media Foundation

User Information

User Name     John Doe - System Admin
Domain Name   FOO
Machine Name  MACHINE A
OS Platform   OS_A
OS Version    5.1.2600.0

Other Options
☑ Close window after creating a link

Profile Settings | Link | New Term                Save

Close

FIG. 5B

Glossary Lookup

Search Term: _____    Projects List: Media Foundation

☐ Exact  ☑ Similar  ☐ In projects    [Search]

Search results for:

| TERM | PROJECT |
|---|---|
| streaming | Media Foundation |
| MPEG | Media Foundation |
| analog | Media Foundation |
| ▲ bandwidth | Media Foundation |
| codec | Media Foundation |
| video telephony | Media Foundation |
| broadcast | Media Foundation |

Term Definition

The data transfer capacity of a transfer medium.

Approved: NO   Active: YES   Displaying definition for "See Other" term!

Link Text (text selection): _____

| Profile Settings | Link | New Term |

CURRENT ROW INDEX: 13

[Comments]  [Create Link]  [Close]

FIG. 6A

Edit Glossary Term #6866 -- Web Page Dialog

Edit Glossary Term #6866

? Help    🗔 Save    ✗ Close

PROJECT: NONE
TERM: bandwidth
OWNER: ☒ dmdterm

☑ TERM IS ACTIVE (master switch)
☑ NO EXTERNAL USE (master switch)

| DEFINITION | COMMENTS | SeeALSO | PROJECTS |

⦿ STANDARD TERM
○ 'SEE OTHER' TERM, REFERS TO ANOTHER TERM

THE DATA TRANSFER CAPACITY OF A TRANSFER MEDIUM.

THE DEFINITION TAB IS USED TO SPECIFY A DEFINITION FOR THIS TERM. IF THIS IS A 'SEE OTHER' TERM, THE USER MAY SELECT ANOTHER TERM TO WHICH IT REFERS.

FIG. 6B

Edit Glossary Term #6866 -- Web Page Dialog

Edit Glossary Term #6866

? Help    💾 Save    ✕ Close

PROJECT: NONE
TERM: bandwidth
OWNER: dmdterm ✉

☑ TERM IS ACTIVE    ☑ NO EXTERNAL USE

| DEFINITION | COMMENTS | SeeALSO | PROJECTS |

B *I* <u>U</u>

BANDWIDTH IS USUALLY EXPRESSED IN THE NUMBER OF BITS THAT A SYSTEM IS CAPABLE OF TRANSFERRING IN A SECOND: BITS PER SECOND (BPS) OR KILOBITS PER SECOND (Kbps).

DO NOT USE BIT RATE AND BANDWIDTH INTERCHANGEABLY.

UPDATED: 5/30/02 PER GLOSSARY TASK FORCE
UPDATED GUIDELINES: 6/20/03
UPDATED DEFINITION PER GLOSSARY WORKING GROUP (5/26/04)

THE COMMENTS TAB IS USED TO ENTER EDITORIAL OR PROCEDURAL COMMENTS ON A TERM ENTRY. COMMENTS DO NOT GET COMPILED INTO THE FINAL OUTPUT FORMAT

FIG. 6C

Edit Glossary Term #6866 -- Web Page Dialog

Edit Glossary Term #6866

? Help | Save | ✕ Close

PROJECT: NONE
TERM: bandwidth
OWNER: dmdterm ✕

☑ TERM IS ACTIVE (master switch)
☑ NO EXTERNAL USE (master switch)

| DEFINITION | COMMENTS | SeeALSO | PROJECTS |

➕ ADD LINKS   🗑 REMOVE LINK

DMD
  MEDIA
    📄 MEDIA PLAYER
      ┊⋯ ❓ BIT RATE
    📄 WORD LIST (DMD)
      ┊⋯ ❓ BIT RATE

THE SeeALSO TAB IS USED TO MANAGE 'SEE ALSO' REFERENCES ASSOCIATED WITH THIS TERM.

CENTRALIZED TERMINOLOGY AND GLOSSARY DEVELOPMENT

TECHNICAL FIELD

Embodiments of the present invention relate to the field of data development and management. In particular, embodiments of the invention relate to developing and managing terminologies and glossaries among multiple users.

BACKGROUND OF THE INVENTION

Presently, when multiple users within an organization (e.g., a corporation, enterprise, or university) define various terms for documentation projects (e.g., user assistance, legal, or educational documents), these users usually construct their own terminologies without regard to other users' terminologies. Unfortunately, various users within the organization often cannot effectively share terms and definitions across the organization. The inability to share terms and definitions across the organization results in an inefficient workflow among users who develop documentation projects.

Further complicating the problem, users within the same organization often use inconsistent terms and definitions, which makes localization of terminologies and glossaries difficult. For example, a German localizer attempting to translate a glossary from English to German may identify two different terms (e.g., "shortcut key" and "keyboard shortcut") that describe the same concept. In this case, the German localizer has to decide if either or both of these terms properly describe the concept. Because existing systems and methods do not provide a mechanism for effectively managing terminology and glossary data, different users within the organization may not properly use a consistent term to describe a single concept. Therefore, the organization may incur a larger cost to localize terminologies and glossaries.

To accomplish consistent terminology usage within an organization and to reduce the localization costs associated with developing and managing terminologies and glossaries, there is a desire for a technique to share terms and definitions across the organization. Moreover, some users within the organization may fail to properly document their terminology. Thus, there is also a desire for a technique to capture undocumented terms and definitions for localization purposes. By capturing and documenting terminologies and glossaries, the organization may reduce the localization costs and the efforts to rewrite definitions multiple times. Currently, to perform such data sharing and localization, the organization may have an editor or writer who visits various documentations (e.g., websites) to redefine and/or document different terms for consistent terminology usage.

Presently, three classes of tools are available to help an organization to create terminologies and glossaries. First, help developing tools are designed for an organization to build glossaries for software products, print products, and websites. These help developing tools usually create an alphabetical list of terms and definitions as a reference item in a product. The list of terms and definitions created by these help developing tools are usually in a single language. Examples of such help developing tools include RoboHelp® of Macromedia®, WinHelp®, and Doc-To-Help® of ComponentOne®.

Second, enterprise terminology management tools are available for an organization to manage and control the organization's multilingual terminology. These tools are built on a database and may be part of a larger suite of tools. However, these enterprise terminology management tools may or may not have the ability to build individual glossaries. In addition, such enterprise terminology management tools are not Web-based application tools. Examples of such tools include SAP®'s SAPterm (sold as part of SAP® Knowledge Warehouse) and IBM Corporation's company-wide terminology and glossary database application called TransLexis®.

The third class of tools is enterprise terminology management tools that are sold individually. These tools are built on a database and may be part of a larger suite of tools. Most of these tools are sold by the localization industry and are mainly for multilingual use (e.g., concept-based systems). Examples include TRADOS®'s MultiTerm® and STAR AG's TermStar®. MultiTerm® is a partially concept-based tool that associates translations of a term with a single definition and that allows a user to search terms in other languages and to customize metadata attached to various entries. TermStar® is a scalable, multilingual database that is concept-based.

Nevertheless, these classes of tools do not have some of the features that allow centralized development and management of terminologies and glossaries to provide consistent and rational terminology usage among multiple users, for example, in an organization.

Accordingly, a solution that allows centralized development and management of terminologies and glossaries within an organization is desired.

SUMMARY OF THE INVENTION

Embodiments of the invention overcome one or more deficiencies in the prior art by providing, among other things, centralized development and management of terminologies and glossaries within an organization. According to one embodiment of the invention, a central memory area such as a relational database, a managing component (e.g., a Web-based interface application), and a developing component provide a collaborative environment for users within an organization to develop and manage terms and definitions. Accordingly, various users may share terms among different projects, learn usage guidelines, cross-reference related terms, and customize terms to fit particulars of an individual project. One embodiment of the invention also allows users to produce glossaries in various formats for different uses and to integrate the documentation build process. Therefore, users may develop and manage terminologies and glossaries for a diverse group of audiences. Embodiments of the invention thus allow consistent terminology usage across the organization such that a single term corresponds to a single definition.

Moreover, embodiments of the invention provide a database schema for storing various data such as terminology and glossary data associated with an organization. In particular, the database schema allows a user within the organization to define a relationship among a term, a project, a group (e.g., a technology group), and a product (including a service) of the organization such that terminologies and glossaries within the organization may be properly and consistently developed and managed. One embodiment of the invention further allows an administrator to assign different account types to users within the organization. Based on their assigned account types, the users have various permission rights regarding terminology and glossary data stored in the central memory area.

Briefly described, a method employing aspects of the invention develops terminology for use within an organization. The method includes receiving data representing a term from a user. The method also includes receiving data representing one or more projects to be associated with the term in the organization from the user. The method further includes linking the received data representing the term with the received data representing the one or more projects in a memory area. The method includes generating a glossary for the one or more projects. The generated glossary includes the term.

In another embodiment of the invention, a system employing aspects of the invention develops terminology for use within an organization. The system includes a memory area for storing terminology data related to the organization. The system also includes a processor configured to execute computer-executable instructions to receive data representing a term from a user and to receive data representing a project to be associated with the term in the organization from the user. The processor is also configured to execute computer-executable instructions to link the received data representing the term and the received data representing the project in the memory area and to generate a glossary including the term for the project.

In yet another embodiment of the invention, computer-readable media have computer-executable components for developing terminology for use within an organization. The computer-readable media include a memory component for storing terminology data related to the organization. The computer-readable media also include an interface component for receiving data representing a term from a user and for receiving data representing a project to be associated with the term in the organization from the user. The computer-readable media further include a developing component for linking the received data representing the term with the received data representing the project in the memory component and for generating a glossary for the project. The generated glossary includes the term.

In further yet another embodiment of the invention, computer-readable media have stored thereon a data structure for managing terminology among multiple users. The data structure includes a glossary list field for storing data identifying one or more glossary terms. The data structure also includes a project field for storing data specifying a project of the organization. The project is associated with the glossary terms identified in the glossary list field. The data structure further includes a group field for storing data specifying a group of the organization. The group represents a collection of projects. The collection of projects includes the project specified in the project field.

Computer-readable media having computer-executable instructions for performing methods of managing terminology among multiple users and of developing terminology for use within an organization embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIGS. 6A to 6C are block diagrams illustrating an exemplary user interface of an edit tool according to one embodiment of the invention.

Corresponding reference characters indicate corresponding parts throughout the drawings.

DETAILED DESCRIPTION OF THE INVENTION

Exemplary Environment

Figure 1:
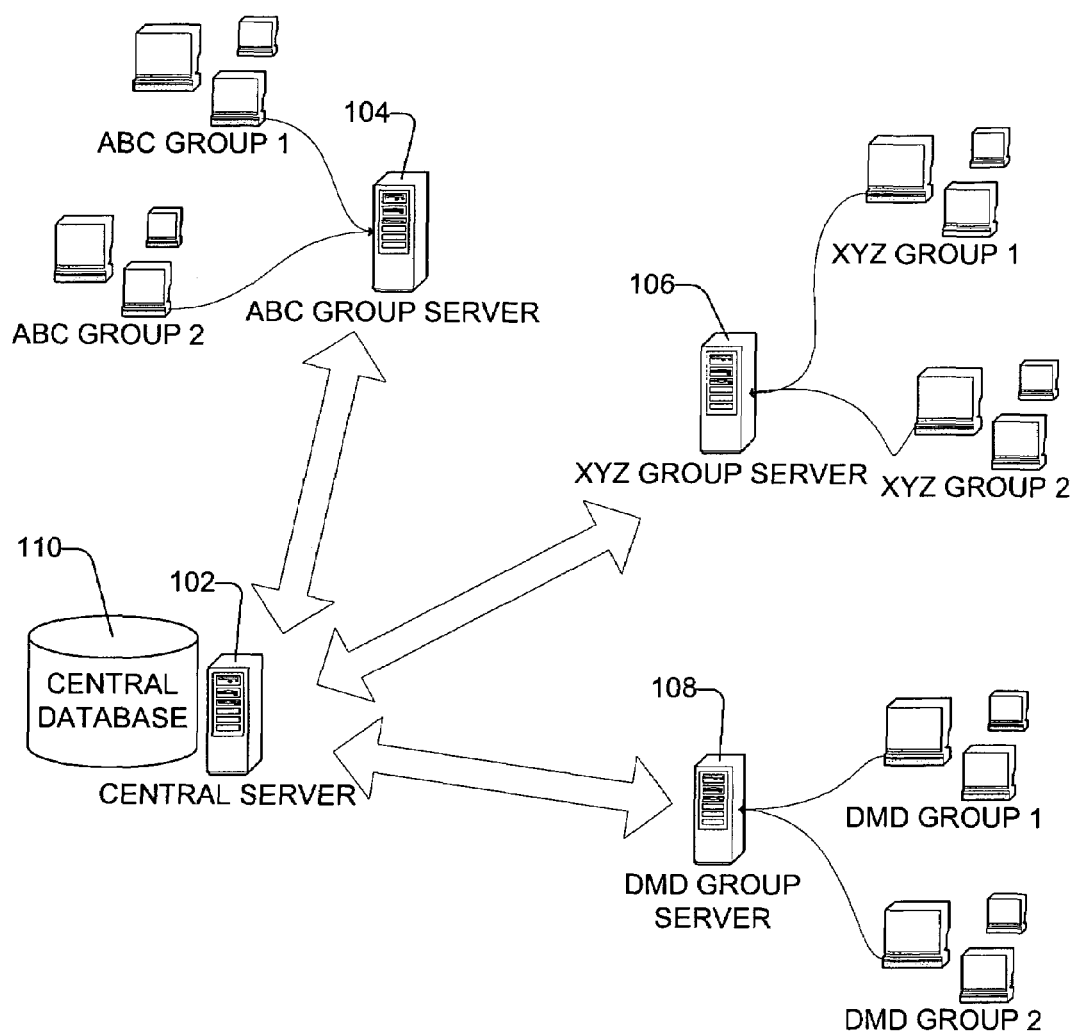
FIG. 1 is a block diagram illustrating an exemplary network environment in which embodiments of the present invention may be utilized.

Referring first to FIG. 1, a block diagram illustrates one example of a suitable network environment in which embodiments of the invention may be utilized. An organization may have various teams or groups, such as groups ABC, XYZ, and DMD illustrated in FIG. 1. Each of the different groups has an associated server that is configured to communicate with a central server 102. For example, the ABC group has an associated ABC group server 104, the XYZ group has an associated XYZ group server 106, and the DMD group has an associated DMD group server 108. The central server 102 has an associated central memory area such as a central database 110 that stores data regarding terminologies and glossaries created by the various groups of the organization.

By using the distributed approach illustrated in FIG. 1 in conjunction with the central database 110, individual group members (e.g., ABC Group 1) may function independently of each other in designing their own terminology but still share their knowledge with other group members or other groups. This approach allows each group to share its terminology while benefiting from the terminologies of other groups. As a result, the organization may consistently develop and manage terminologies and glossaries for its various documentation projects.

As shown in FIG. 1, each group of the organization maintains its own local server, which locally stores the group's terminology and glossary data. Periodically, a group member may initiate a routine to replicate a new or edited term to central server 102 for storage in central database 110. Similarly, a group member may review the terminology and glossary data stored in central database 110, search and select terms that may be useful for its documentation project, and migrate useful terms back to its associated local server such as server 104, 106, or 108. Accordingly, central server 102 and central database 110 function as a repository or data warehouse that provides a central point of data sharing for different group servers. Embodiments of the invention thus allow each group, whether situated locally or remotely, to share its data without maintaining a full-time connection to central server 102. Moreover, each group may maintain its own autonomous local server and retain its own identify and control as desired.

In an alternative embodiment of the invention, different groups within the organization do not maintain their own local servers. That is, each group may communicate directly with central server 102 without using an associated local server (e.g., servers 104, 106, and 108). In this case, each group may communicate directly with central server 108 via an interface (e.g., a Web-based interface application).

Figure 2:
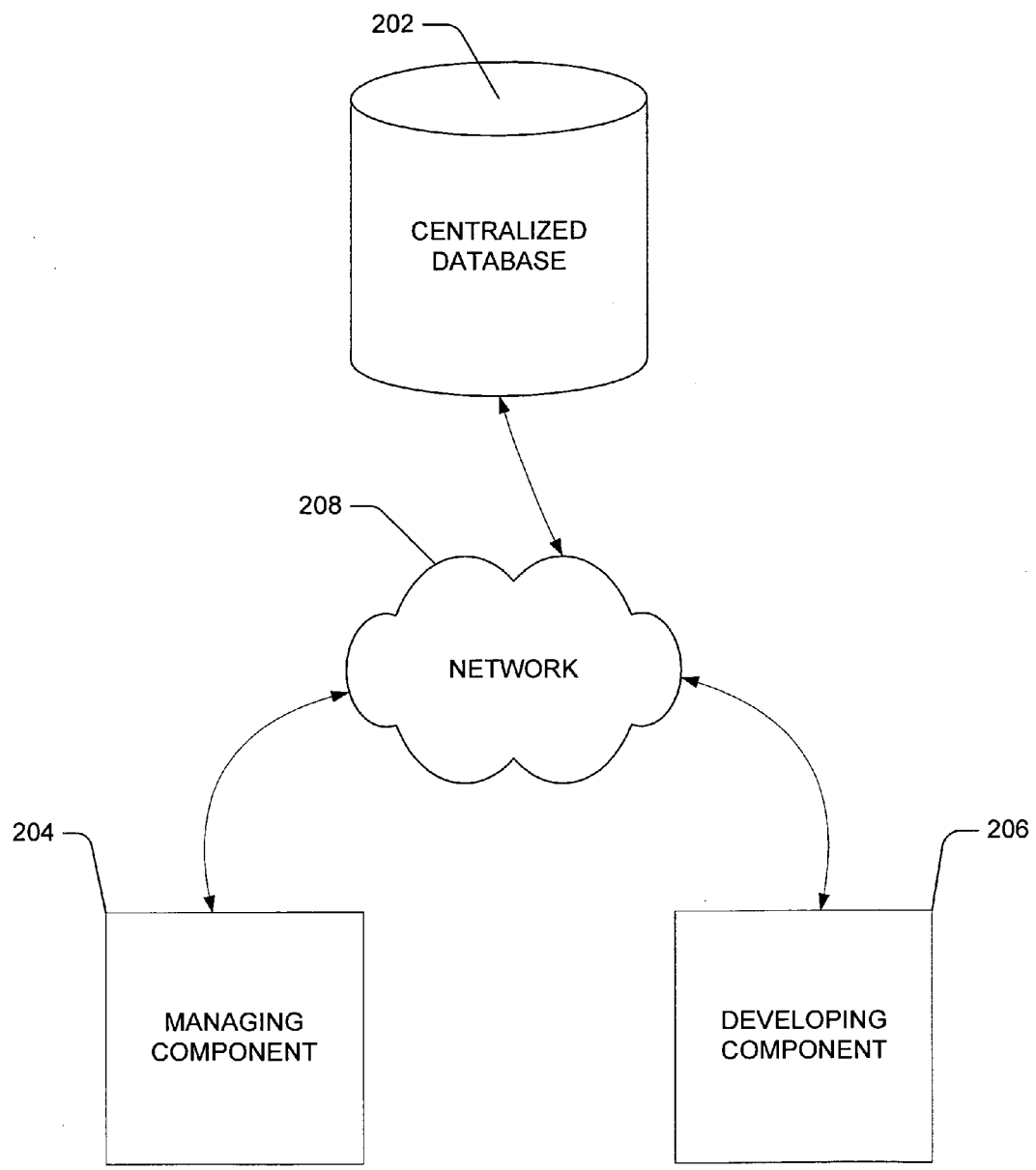
FIG. 2 is a block diagram illustrating an exemplary environment for developing and managing terminologies and glossaries according to one embodiment of the invention.

FIG. 2 illustrates an exemplary environment for developing and managing terminologies and glossaries within an organization. As shown, the environment includes a central database 202, a managing component 204, and a developing component 206. The environment illustrated in FIG. 2 allows a user to create, edit, collate, and manage terminologies and glossaries across the organization. The user may also output data in a desirable format (e.g., compiled hypertext markup language help format (CHM)). The managing component and the developing component 206 communicate with the central database 202 via a communications network 208 such as a local area network (e.g., an intranet, extranet, etc.) or a wide area network (e.g., the Internet).

Exemplary Central Database, Database Schema, and Database Rules

According to one embodiment of the invention, central database 202 is implemented as a relational database such as a structured query language (SQL) database. Central database 202 stores terminology and glossary data based on a three-tier hierarchical structure. This three-tier hierarchical structure allows central database 202 to support multiple documentation projects within the organization for many different groups (e.g., technology groups) and products (including services). Central database 202 also includes a permissions structure that allows an administrator to define which project(s) a given user has viewing, edit, and/or administrative rights to and the extent of such rights. Moreover, central database 202 includes a structure that allows a user to define his or her user preferences or options, which are persisted between user sessions. Foreign keys and constraints maintain and enforce the proper data structure and referential integrity in central database 202. To reduce data inconsistency problems and invalid references, one embodiment of the invention may prohibit direct access to data fields in central database 202. Thus, a user may perform data access and data manipulation via SQL objects. Moreover, the user may use stored procedures to insert, update, and delete data as well as to enforce database rules.

Figure 3:
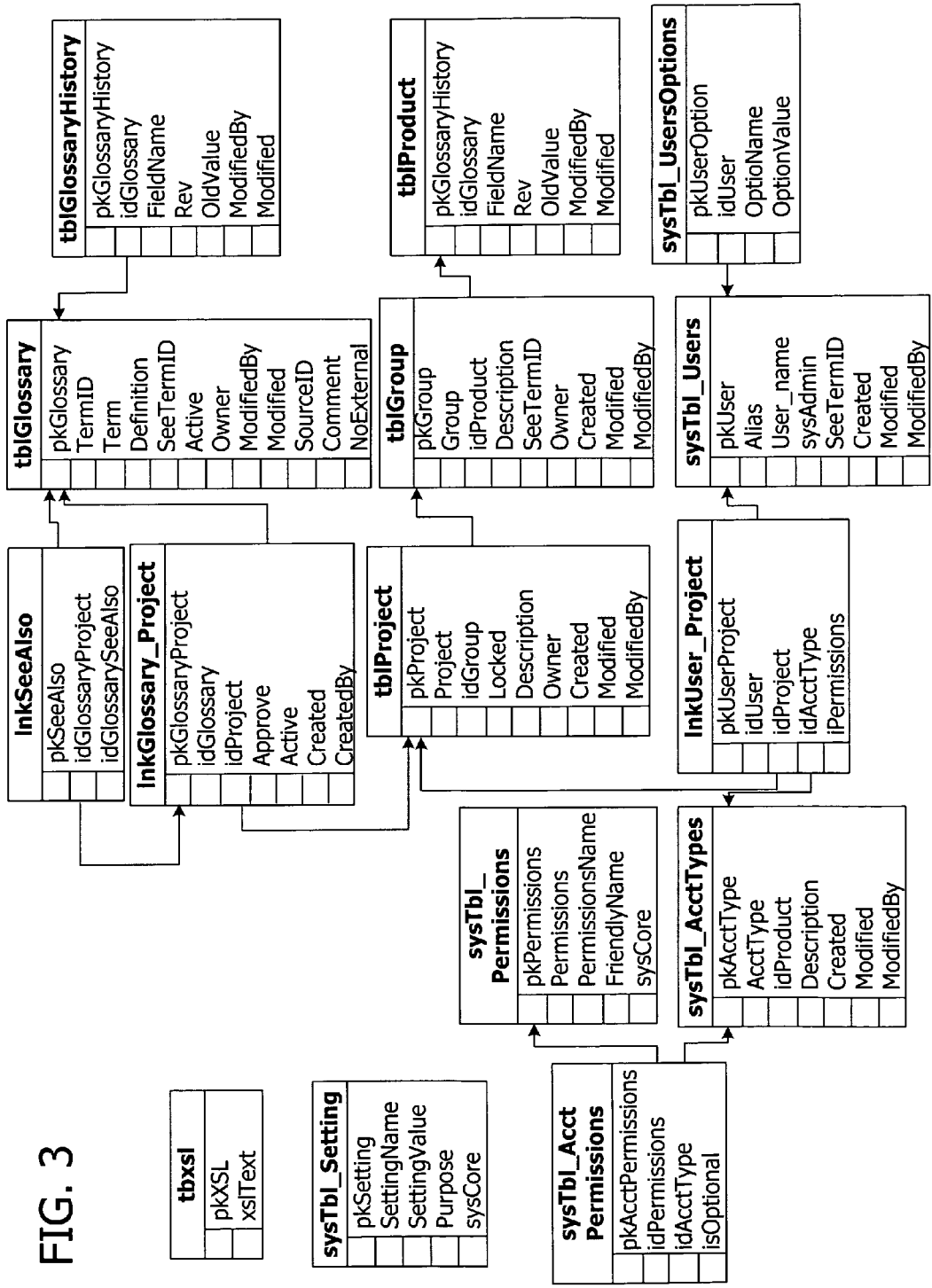
FIG. 3 is a block diagram illustrating an exemplary database schema for storing data in a central memory area according to one embodiment of the invention.

FIG. 3 illustrates an exemplary database schema for storing various data (e.g., terminology and glossary data) in central database 202. FIG. 3 shows a trio of fields (e.g., tables) that define the three-tier hierarchy of projects, groups (e.g., technology groups), and products (including services). A table called tblProject is a field that stores data representing individual documentation projects. A table called tblGroup is a field that stores data representing a collection of one or more projects. And a table called tblProduct is a field that stores data representing a collection of groups and their projects for a given product. Moreover, tblProject includes an idGroup entry that maps a project to a particular group specified in tblGroup. Similarly, tblGroup includes an idproduct entry that maps a group to a particular product specified in tblProduct.

While some users or groups in the organization may not need the three tiers to manage or develop terminology and glossary data, the three-tier hierarchical structure allows scalability for larger documentation projects as well as for implementing a group-wide or organization-wide terminology and glossary solution.

In an embodiment of the invention, database rules define the relationships among the three tiers (e.g., projects, groups, and products) illustrated in FIG. 3. For example, the database rules may specify the following:

A project is associated with one group.
A group may include zero to many projects.
A group is associated with one product.
A product may include zero to many groups.
A project may not exist without a parent group.
A group may not exist without a parent product.
A product may exist by itself.

The database rules also define a relationship between a project and a term as follows:

A project may include zero to many terms.
A term may appear in zero to many projects.
A term may not appear in the same project more than once.

Such a relationship may be specified by using an intermediary table to join two tables together. For example, FIG. 3 shows that a table called InkGlossary_Project joins tblProject and tblGlossary together to specify a relationship between a documentation project and a particular term (e.g., a glossary term). This intermediary table allows a single project to refer to multiple terms and allows a single term to be referred by many different projects.

The database schema also allows a single term entry to be reusable by many different projects, which promotes consistency in the documentations produced in the organization. Furthermore, since a project may exist without a term and a term may exist without being referred to by a project, some terms that are not in use may be abandoned without affecting the integrity of the database schema. Thus, embodiments of the invention allow the organization to retain abandoned data for future use or reference even if the data is not currently being used.

In some cases, editorial policies may dictate that a given term does not have a definition of its own but instead refers to the definition of another term as its definition (i.e., See Other references). For example, editorial policies may provide that the term "CD" is to refer to the definition of the term "Compact Disc." Thus, a single update to the definition of the term "Compact Disc" means that the term "CD" is automatically updated with the new definition. This type of definition referral simplifies the management of terms that otherwise have duplicate definitions. Central database 202 allows a user to perform such definition referral by inserting an identifier (ID) of the term that is being referred to in the "SeeTermID" entry (e.g., of the table tblGlossary illustrated in FIG. 3) of the term doing the referring. For example, the term "CD" may have no definition of its own but may hold the ID of the term "Compact Disc" in its "SeeTermID" entry. This "self-join" reference links one record in a table to another record within the same record.

In other cases, a single term may have multiple references to other related terms. For example, the term "server" may have See Also references to the terms "client-server" and "server farm." A term having a See Also reference may have its own definition. But this term may refer to other terms that describe a similar or related concept. In one embodiment of the invention, the database rules define the See Also references to be project-specific. Thus, an intermediary table allows a single term to refer to another term within the same project. For example, a table called InkSeeAlso allows multiple joins between various terms and a project. To summarize, the database rules specify the following with regard to See Also references:

See Also references are created between two different terms.

Both the term doing the referring and the term being referred to are within the same Project.

A term record may be shared among multiple projects and may have See Also references that are project-specific.

The database schema of central database 202 also allows a user to define a Part of Speech of a term. In an embodiment of the invention, the user may not be allowed to define more than one Part of Speech per term. Table 1 shows an exemplary database table for storing Part of Speech data according to one embodiment of the invention.

TABLE 1

Exemplary Part of Speech Database Table

| ID | Abbreviation | Part of Speech |
|---|---|---|
| 0 | NS | Not Selected [default] |
| 1 | O | Other |
| 2 | N | Noun |
| 3 | V | Verb |
| 4 | Adj | Adjective |
| 5 | Adv | Adverb |

An administrator may further define relationships between different users and projects via the database schema and rules. Such defined relationships are a security implementation that allows the administrator to assign various permissions to various users on a per-project basis. An intermediary table in the database schema provides this multi-join capability. Moreover, the database rules may specify the following:

A user may be associated with zero to many projects.

A project may be associated with zero to many users.

A user may not be associated with a given project more than once.

A project may exist that has no associated users.

A user may exist that is not part of any project.

Embodiments of the invention provide different user account types based on relationships between users and projects. Thus, an administrator may grant certain permission rights to a user with regard to terminology and glossary data by assigning a particular account type to the user. For example, the following account types are available:

Guests: Read-only access to the stored terminology and glossary data. By default, users have read-only access to any project in central database 202.

Level 3: Basic edit permissions on a project.

Level 2: Advanced edit permissions on a project.

Level 1: Limited administrative permissions on a project.

Group administrator: Administrative privileges on projects within a group.

Product administrator: Administrative privileges on groups and projects within a product.

Content Administrator: Administrative privileges on content-related issues with a global scope.

System administrators: Administration privileges for data stored in central database 202.

Users within level 3 permissions are referred to as authors. Users with level 2 permissions are referred to as editors. And users with level 1 permissions are referred to as project administrators. A table called sysTbl_AcctTypes specifies each of these account types. An administrator may link a user specified in a table called sysTbl_Users to an account type specified in sysTbl_AcctTypes via an intermediary table called lnkUser_Project.

In an embodiment of the invention, users within the organization automatically have guest permissions. In other words, any user within the organization may browse any project as he or she desires. However, a user without other proper permissions may not be able to create, edit, delete, or manage terminology and glossary data. For example, a user may have edit permissions on Project A, administrative permissions on Project B, and guest permissions on the remaining projects within the organization. In addition, to provide flexibility, an administrator may optionally assign additional permissions to authors and editors on a per-project basis.

APPENDIX A provides an exemplary implementation of user permissions regarding terminology and glossary data according to one embodiment of the invention.

The database schema of central database 202 also includes a table called sysTbl_UsersOptions for a specific user to store his or her user preferences or options. Such user preferences or options are persisted from one user session to another. sysTbl_UsersOptions allows a single user to specify multiple user preferences or options.

One embodiment of the invention provides a localization flag to indicate whether a given term has been localized and to provide localization details. Therefore, the database schema includes a database table to store a localization record. This database table is linked to a term specified in the table tblGlossary by holding a reference to the primary key (pkGlossary) of the term. Table 2 provides an exemplary database table for storing localization data according to one embodiment of the invention.

TABLE 2

Exemplary Localization Database Table

| Entry | Description |
|---|---|
| pkLocalization | Primary Key |
| fkGlossary | Foreign Key |
| Language | Country code |
| Term_LocFilesPath | Path to a localization file for a given term |
| Def_LocFilesPath | Path to a localization file for a given definition |
| Modified | Last modified date and time |
| ModifiedBy | Alias of the user who last modified the record |

The database rules specify that a localization record be linked to its parent term via the fkGlossary entry, which stores an ID of the parent term. A given term may be associated with zero to infinity localization records. The Language entry holds a two-letter country code of a pertinent language. The database rules allow one localization record per language. The Term_LocFilesPath entry holds a uniform naming convention (UNC) network path to a localization file that includes the localized version of the term. If the term has not been localized to the specified language, then this entry may be null. The Def_LocFilesPath entry holds a UNC network path to a localization file that includes the localized version of the term's definition. If the term's definition has not been localized to the specified language, then this entry may be null.

Further illustrated in FIG. 3, a table called tblGlossaryHistory stores data relating to changes made to a particular term stored in central database 202. A user may link a particular glossary history record to its parent record by including the ID of the parent glossary term in an idGlossary entry of tblGlossaryHistory. As a term matures and undergoes changes over time, central database 202 may include many related history records. To maintain these history records, central database 202 automatically generates a revision number for each set of changes. This revision number allows a user to rollback a term to its previous version. Moreover, the user may record the rollback itself as a change to subsequently roll forward the term. One embodiment of the invention provides a SQL trigger to consistently log changes to various terms stored in central database 202. Therefore, changes made directly to the table data may be logged.

One embodiment of the invention further allows the user to track revision histories of projects, groups, and products stored in central database 202. The database schema includes a tracking table named tblProjectHistory that is linked to tblProject for tracking changes made to a project specified in tblProject. The table tblProjectHistory includes the following entries: project, idGroup (e.g., an ID or name of the parent group), owner, and description. The database schema also includes a tracking table named tblGroupHistory that is linked to tblGroup to track changes made to a group specified in tblGroup. The table tblGroupHistory includes the following entries: group, idProduct (e.g., an ID or name of the parent product), owner, and description. Moreover, a tracking table named tblProductHistory is linked to tblProduct via a foreign key constraint to track changes made to a product specified in tblProduct. The table tblProductHistory includes the following entries: product, owner, and description. A SQL trigger consistently logs changes made to various projects, groups, and products in these tracking tables.

Exemplary Managing Component

According to one embodiment of the invention, managing component 204 is an interface that allows a user to manage terminology and glossary data stored in central database 202. For example, managing component 204 may be implemented as a Web service or a Web-based application that provides an interface (e.g., a query interface) to interact with central database 202. By implementing managing component 204 as a Web-based interface, updates (e.g., codes, fixes, etc.) to managing component 204 may be effectively implemented with minimal input from the user. This is in contrast to standalone or distributed resident applications in which users manually implement the updates. In an embodiment of the invention, the user may access managing component 204 via a website, a command-line tool, etc.

Managing component 204 provides a set of Web services that allow the user to effectively and efficiently manage terminology and glossary data. The Web services of managing component 204 include a query service, an export service, a connector service, and a lookup service. The query service provides a programmatic means of querying central database 202. The user may access the query service via any tool, including a website or a command line tool. The query service includes a fetch method to allow the user to create his or her query tools. The fetch method accepts a single dataset parameter, referred to herein as the QueryParameters Dataset. When the user invokes the fetch method, the fetch method constructs the base query statement (e.g., in SQL). The fetch method then passes the base query statement with the QueryParameters Dataset to a method that uses this information to construct and execute the query. The resulting Dataset is then passed back to the calling fetch method. The fetch method then passes the Dataset to the user.

The QueryParameters Dataset includes a table named QueryParameters table and may include a SelectColumns table. The SelectColumns table allows the user to specify a subset of the columns he or she desires to be returned from the query. The QueryParameters table holds the QueryParameter state-ments to be used in the data fetch. There is no limit to the number of QueryParameter statements that may be specified. Each QueryParameter statement includes four string fields, as shown in TABLE 3.

TABLE 3

Exemplary QueryParameters Table

| Column | Description |
| --- | --- |
| AndOr | May be either an "AND" or an "OR" clause. |
| ColName | The name of the parameter column. |
| Comparison | The comparison method, such as =, >=, NULL, etc. |
| ColValue | The value to search for in the data field specified by ColName. |

If no QueryParameter statements are supplied, then the various records stored in central database 202 are included in the resulting Dataset.

The SelectColumns table allows the user to specify the columns he or she desires to have returned when the fetch method is executed. Each SelectColumns record includes a string field, as shown in TABLE 4.

TABLE 4

Exemplary SelectColumns table

| Column | Description |
| --- | --- |
| ColName | The name of the parameter column. |

An embodiment of the invention also provides a method that automatically constructs the QueryParameters and SelectColumns tables and passes them to the client wrapped in a QueryParameters Dataset. Accordingly, the user may submit a query without manually constructing a properly formatted data table.

The query service also includes a RecCount method, which is similar to the fetch method except that it returns an integer value instead of a full Dataset. The integer value represents the count of the records that would have been returned given the specified QueryParameters. This allows the user to know the number of records that may be returned before actually executing the query.

The query service further includes a schema method that returns schema information on the data stored in central database 202. For example, a developer may use the schema list to populate a drop-down list of available field names from which his or her users may select. The schema method takes no parameters and returns a Dataset including a single table referred to as "Schema." The Schema table lists the column name, data type, and ordinal for each column in the various database tables stored in central database 202.

The Web services of managing component 204 also include an export service. The export service allows the user to export terminology and glossary data without a separate client-side tool. The export service provides a programmatic means for the user to export terminology and glossary data from central database 202. The user may access this service via any tool, including a website or a command line tool. In an embodiment of the invention, an export is a pre-defined query that outputs the resulting data in a format specified by the user.

The export service includes an export method. When the user invokes the export method, the export method uses an ExportRequest Dataset to construct and execute the query, format the resulting data into the specified schema, and add the data to an ExportResults Dataset. The export method then returns the ExportResults Dataset to the user.

The ExportRequest Dataset includes an ExportRequest table and may also include a QueryParameters table. The ExportRequest table holds the settings for the export. The QueryParameters table holds the filter statements to be applied to the export query. The ExportRequest table includes two integer fields (SchemaType and ObjectType) and a string field (ObjectPK), as described in TABLE 5.

TABLE 5

Exemplary ExportRequest table

| Column | Description |
| --- | --- |
| SchemaType | The schema to which the data is to be exported. |
| ObjectType | The type of object being exported. |
| ObjectPK | The identifier of the object being exported. |

The ObjectType field may store a value that represents a product, a group, or a project. The SchemaType field stores a value that represents a particular type of schema. The ObjectPK field stores a valid identifier (or primary key) that refers a valid object as specified by the value stored in the ObjectType field.

The QueryParameters table used by the export method is similar to the QueryParameters table used by the fetch method of the query service. The QueryParameters table holds the QueryParameter statements to be used in filtering the export data. There is no limit to the number of QueryParameter statements that may be specified. In an embodiment of the invention, the export data is automatically pre-filtered such that the export excludes those terms that are not within the specified object type and those terms that are not both active and approved. But the user may specify other filter statement as well.

An embodiment of the invention also provides a method that automatically constructs the ExportRequest and QueryParameters tables and passes them to the client wrapped in an ExportRequest Dataset. Accordingly, the user may submit a query without manually construct a properly formatted data table.

The export service also includes a RecCount method, which is similar to the export method except that it returns an integer value instead of a full Dataset. The integer value represents the count of the records that would have been exported given the specified ExportRequest and QueryParameters. This allows the user to know the number of records that may be exported before actually exporting the data.

The Web services of managing component 204 also include a connector service that provides a programmatic means for obtaining database login parameters (e.g., username and password) to external tools that access central database 202 directly. The Web services further include a lookup service that provides the functionality for allowing external tools to access central database 202.

Managing component 204 provides a list-based user interface (UI) that allows the user to easily locate and manage terminology and glossary data stored in central database 202. In particular, the UI of managing component 204 displays a list of terms for a particular project and allows the user to manage the terms. Based on a permission setting, the user may also manage one or more projects linked from a particular term. Managing component 204 also allows an administrator to create a link between a project and a term and to run reports based on the terminology and glossary data stored in central database 202.

Managing component 204 includes a filter bar built on the UI to allow the user to filter data on the displayed list. The filter bar supports various types of querying, including AND, OR, absolute criteria, range criteria, etc. Managing component 204 also supports keyboard navigation of the displayed list, thus providing a flexible interface for a Web-based application. For example, the user may press the Up or Down key to select a record in the displayed list, press the Enter key or the spacebar to open the selected record, and type Ctrl-right or Ctrl-left to navigate through data pages.

In one embodiment of the invention, the UI of managing component 204 is based on a combination of hypertext markup language (HTML) elements, cascading style sheets (CSSs), and dynamic HTML (DHTML) scripting. Moreover, managing component 204 may access the terminology and glossary data stored in central database 202 via a server associated with central database 202 and return a search result to a client interface (e.g., a browser) associated with the user. By reducing the use of client-side controls, embodiments of the invention provide stability and flexibility in managing component 204 and decrease compatibility problems that may arise from out-of-date, incompatible, or experimental components installed on the client.

Managing component 204 includes a data export functionality that is built-in to the displayed list. Thus, the user may export the terminology and glossary data into various formats for additional analysis or for use in a report or presentation. For example, the exports generated by managing component 204 may include a Part of Speech of a given term. In an embodiment of the invention, the terminology and glossary data is not in a proprietary file format such that the data may be exported into any standard file format without some type of transformation. A report wizard of managing component 204 further allows the user to create an HTML-based report via a communications network (i.e., online) without a separate reporting tool. The reports created by the report wizard may further be exported into various formats. The user may use the report wizard to input multiple query parameters to search for a particular term.

In addition, managing component 204 includes a project wizard that provides step-by-step instructions for the user to create a new documentation project for which one or more terms are to be defined. Via the project wizard, the user may migrate an existing project into a new project such that terms and definitions (and glossaries) of the existing project are cloned to the new project. For example, when two different projects have similar terms to be shared, managing component 204 allows the user to find one or more terms associated with an existing project. The user may then clone these terms to create a glossary for a new project. The user is also able to create a new version of glossary by extracting terms from a previous version and adding these terms (and other new terms) to the new version.

According to one embodiment of the invention, after a user makes a change to a term, project, group, or product stored in central database 202, managing component 204 automatically generates a notification (e.g., via an e-mail) to other users who may be interested or affected by such a change. For example, when the user links a term to a project, managing component 204 sends a notification to other users (e.g., owners, editors, authors, and administrators) of this project. This notification informs the other users that the term has been linked to the project and that approval of the term is desired. In addition, managing component 204 may generate a notification when duplicate terms exist in central database 202 or when a user adds a term that already exists in central database 202 for more than a given number of times (e.g., more than five times). This notification alerts one or more users that duplicate terms exist in their projects, groups, or products. Managing component 204 may send the notification as the user enters a duplicate term into database 202 or after the user has reviewed a report of duplicate terms.

In another embodiment of the invention, a selected user (e.g., based on his or her permission setting) has the ability to defer a notification by activating a Deferred Notification option. When the user activates the Deferred Notification option, changes made by the user do not trigger notifications until the user switches the Deferred Notification option off. To illustrate, the user activates the Deferred Notification option for his or her current session within managing component 204. Managing component 204 stores this user setting in an associated database table named sysTbl_UsersOptions (as illustrated in FIG. 3). Particularly, managing component 204 sets the OptionName entry of sysTbl_UsersOptions to "DeferNotification" and the OptionValue entry of sysTbl_UsersOptions to the current date and time. As the user makes changes to a term, project, group, or product, managing component 204 initiates a SQL trigger named tr_updGlossary to log the changes into correspond tracking database tables. This SQL trigger also checks the OptionName entry of sysTbl_UsersOptions. If the SQL trigger detects the DeferNotification setting, managing component 204 will withhold from sending a notification. Otherwise, managing component 204 sends the notification to users who are interested or affected by the changes. When the user finishes the editing task, he or she switches the Deferred Notification option off. A server-side code then deactivates the DeferNotification setting and fires a SQL routine that constructs and sends a single mass notification. This single notification lists each of the terms, projects, groups, or products that have been edited by the user.

If the user fails to switches the Deferred Notification option off, whether due to human error or network/hardware issues (e.g., crashes, outages, etc.), managing component 204 automatically detects this failure when the user starts a subsequent user session. In particular, when the user starts a subsequent user session, the server-side code automatically detects and deactivates the DeferNotification setting. The SQL routine then constructs and sends the single mass notification.

To provide the deferred notification functionality, a SQL stored procedure called sendDeferredNotification performs the following tasks:

Handling a collation of tracked changes made by the user since he or she activates the Deferred Notification option.

Collating and sending notifications

Deactivating the user's DeferNotification setting.

Embodiments of the invention detect tracked changes by querying specific database tables. Specifically, a procedure fetches the date and time stamp included in the user's OptionValue entry in sysTbl_UsersOptions. This procedure then queries those edits or changes made by the user since the date and time fetched from the OptionValue entry. Accordingly, managing component 204 may track changes made to a term, project, group, or product during a certain period to generate a notification that lists these changes.

Managing component 204 also includes a UI (e.g., a webpage) that displays changes made to a particular term, project, group, or product. This UI also serves as an interface (e.g., a query interface) to the database tables where details of the changes are stored. The UI employs a filter bar layout such that the user may query central database 202 to determine what changes have been made to a term, project, group, or product.

Exemplary Developing Component

Referring back to FIG. 2, developing component 206 provides an environment for a user to create, edit, and delete terminologies and glossaries within the organization. Developing component 206 may be plugged into different environments such that the user may develop terms and definitions using various tools (e.g., using extensible markup language (XML)). Accordingly, regardless of which environment the user chooses, the user may create, edit, or delete terminology and glossary data via developing component 206 if he or she may fetch the data from the environment. Developing component 206 also provides various functionalities (e.g., popup mode, inline text, etc.) for the user to develop terminologies and glossaries. Developing component 206 further includes a drop-down "Quick Links" feature in the main toolbar. The Quick Links feature provides the user direct access to various documents (e.g., websites) on style guidelines and processes, plug-in installs, transfer tool installs, etc.

Figure 4:
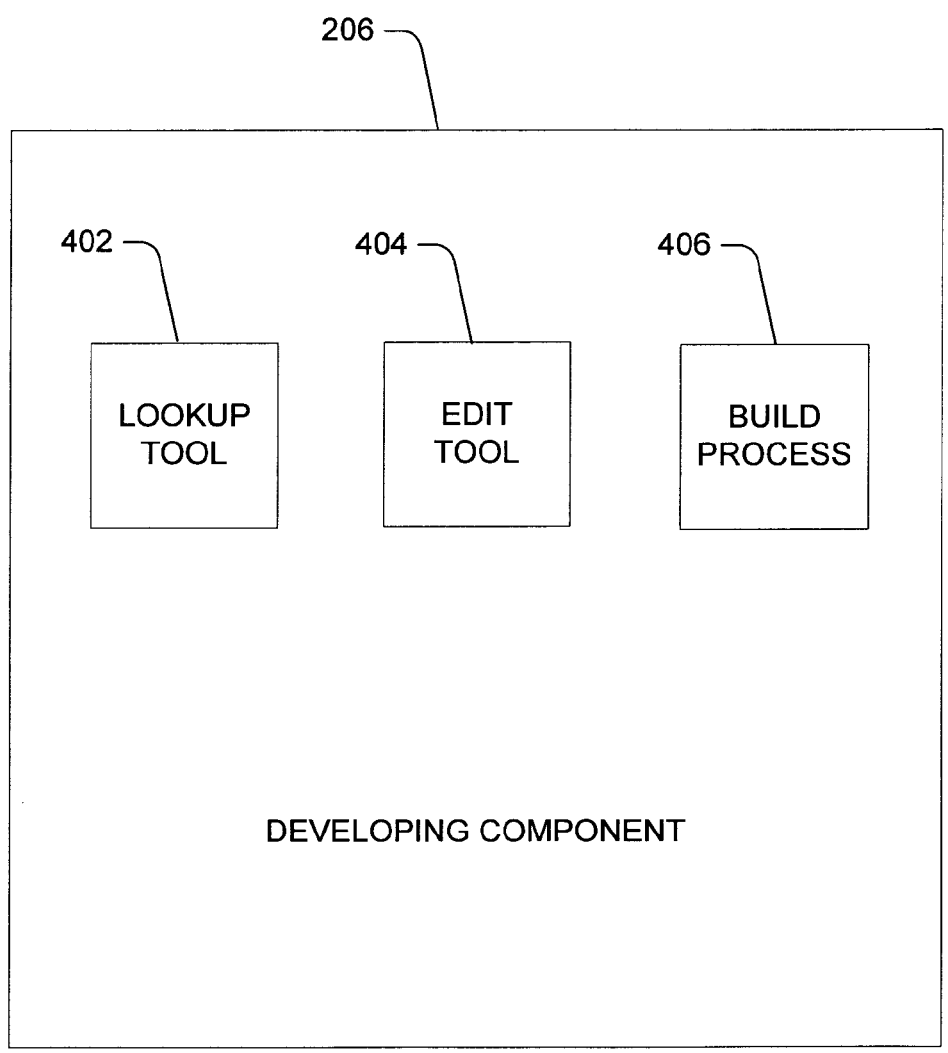
FIG. 4 is a block diagram illustrating an exemplary developing component according to one embodiment of the invention.

As shown in FIG. 4, developing component 206 includes a lookup tool 402, an edit tool 404, and a build process 406 according to one embodiment of the invention. In general, the lookup tool 402 allows a user to search for a particular term stored in central database 202, to select a term displayed in a client UI, and to lookup the definition and other data associated with the selected term. The edit tool 404 allows the user to create or edit a terminology with respect to a documentation project. For example, using managing component 204 as an interface, the user may use edit tool 404 to create, edit, or delete terminology and glossary data stored in central database 202. The build process 406 is configured to extract one or more terminologies associated with a given project and to arrange the extracted terminologies in a proper format for output (e.g., in CHM). Particularly, build process 406 is configured to automatically generate a glossary of terms for the project based on the extracted terminologies. For example, when the user adds one or more terms to a document, build process 406 automatically extracts definitions associated with the added terms from central database 202 to create a glossary within the document (e.g., at the end of the document).

Figure 5C:
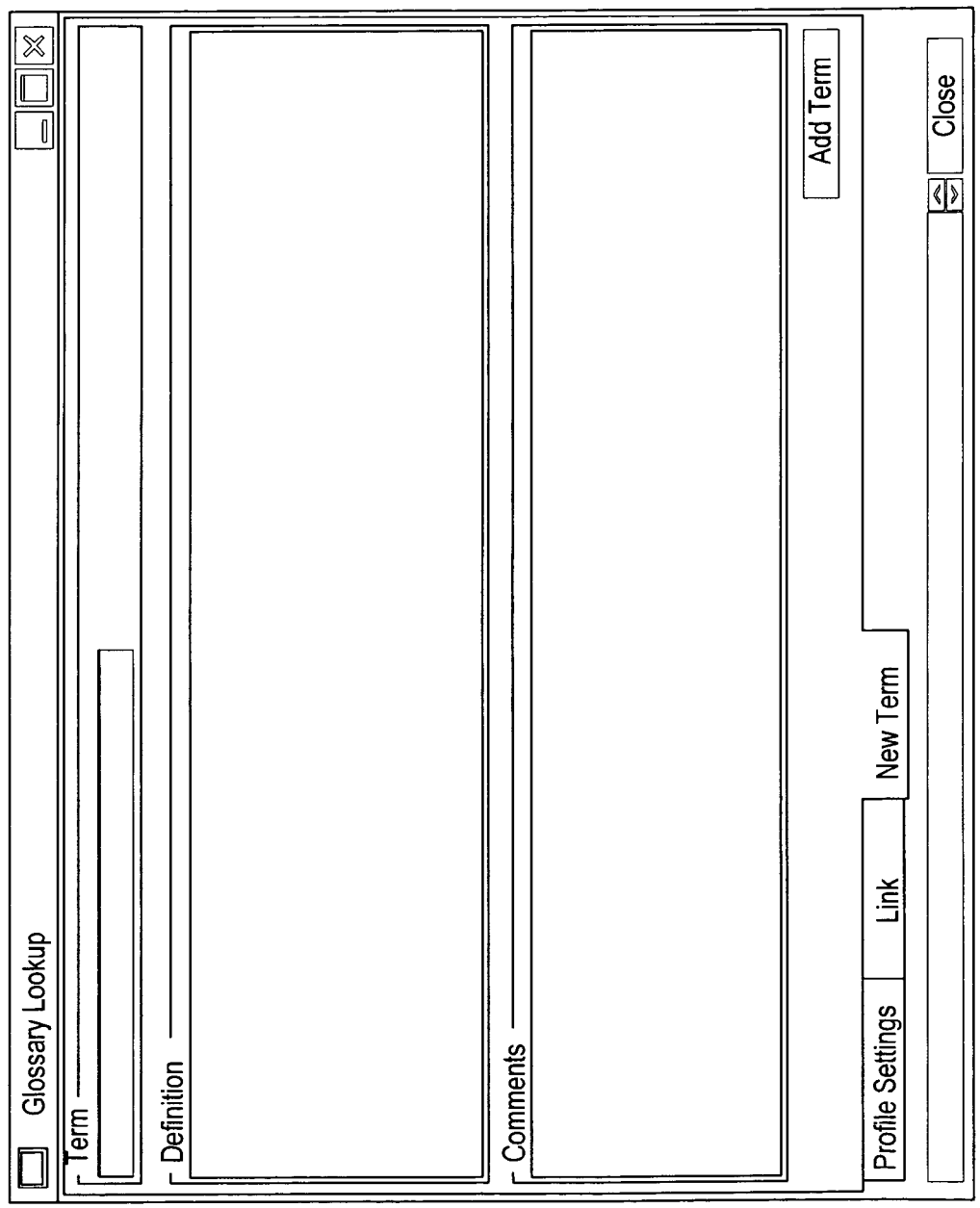
FIG. 5 is a block diagram illustrating an exemplary user interface of a lookup tool according to one embodiment of the invention.

FIG. 5A-5C illustrates an exemplary UI of lookup tool 402 according to one embodiment of the invention. As shown in FIG. 5A, the exemplary UI of lookup tool 402 includes a Profile Settings view. The Profile Settings view allows the user to specify or configure a product, group, and/or project to search for a particular term. Accordingly, lookup tool 402 may limit the search scope to those terms within the specified product, group, and/or project.

As shown in FIG. 5B, the exemplary UI of lookup tool 402 also includes a Link view that allows the user to search for a particular term stored in central database 202. The user may query central database 202 by entering one or more query parameters (e.g., a term and/or a documentation project) in the Link view. Via the query parameters, the user may also specify if he or she wishes to search for an exact term, a similar term, or a term associated with the various projects stored in central database 202. After lookup tool 402 queries central database 202, it displays a search result in the Link view. The search result may indicate that the entered query parameters produce an exact matching term, multiple matching terms, or no matching terms. If the entered query parameters produce multiple matching terms, the user may select a particular term from the multiple matching terms to perform further lookup functions. The search result also returns a project associated with the term (e.g., if the term is included in a glossary of the project). Accordingly, lookup tool 402 provides data regarding whether a particular term is included in the user's project and/or in a different project. If the term is not included in the user's project, lookup tool 402 allows the user to link the term to his or her project and presents the user or another user an opportunity to approve the term if he or she has a proper permissions setting. The search result further includes the definition, the approval status, and the active status of the term found in central database 202. The approval status indicates whether the term has been approved for use in a given documentation project. The active status indicates whether the term is currently actively used. The user may also search for similar terms and other projects associated with the queried term via lookup tool 402.

FIG. 5C shows that the exemplary UI of lookup tool 402 includes a New Term view that allows the user to add a new term for storage in central database 202. Via the New Term view, the user may also enter the new term's definition and/or comments for storage in central database 202.

FIGS. 6A to 6C illustrate an exemplary UI of edit tool 404 according to one embodiment of the invention. This exemplary UI of edit tool 404 displays a term, a project associated with the term (which may be null if the term is not yet associated with a project), and an owner of the term (e.g., the user who created or defined the term). As shown in FIG. 6A, the UI includes a Definition tab, which includes a definition field for the user to specify a definition for the particular term displayed in the UI. If this particular term is a See Other term, then the user may select another glossary term to which this particular term refers.

According to an embodiment of the invention, if the user includes an HTML or XML element in the definition field, edit tool 404 is configured to detect the HTML or XML element and to alert the user that he or she may not include HTML and XML elements in a definition. In addition, edit tool 404 is configured to set the active and approved flags for the offending term to false and to prohibit the user from modifying the active and approved flags. After the user removes the HTML or XML element from the definition field, edit tool 404 may allow the user to modify the active and approved flags for the term, subject to the user's permission setting. The user may also disallow external use of the term (i.e., such that the term entry is not published outside of the organization) by selecting a "No External Use" option in edit tool 404.

FIG. 6B shows that the UI of edit tool 404 also includes a Comments tab, which allows the user to enter editorial or procedural comments on a term entry. These editorial or procedural comments usually are not compiled into an output format (e.g., a glossary of terms or a CHM file). The user may also format (e.g., italicize, underline, etc.) the comments to assist localization of terminologies and glossaries by providing additional insights to the use or context of a particular term. FIG. 6C shows that the UI of edit tool 404 includes a SeeAlso tab, which allows the user to manage the See Also references associated with the term. In an embodiment of the invention, the UI of edit tool 404 also displays a list of other terms that hold a See Also or See Other reference to the current term.

The UI of edit tool 404 further includes a Projects tab. When the user first initiates edit tool 404, he or she may be prompted to select or enter a project ID or project name. After the user selects the Projects tab, edit tool 404 produces a term-by-term list of other projects that are using each term within the selected or entered project. This enables the user to appreciate the impact of a change before making a global change to a term that applies to different projects. For example, the user may select or enter the project "Widgets 9.0." Edit tool 404 then displays each term associated with this project, along with other projects that are sharing each term. Edit tool 404 further displays the name and/or e-mail alias of a referencing project's owner. Table 6 provides an exemplary display of the Projects tab according to one embodiment of the invention.

TABLE 6

Exemplary Display of the Projects Tab

| Term | Referencing Project | Project Owner |
| --- | --- | --- |
| Gadget | Project X | Joe |
|  | Project Y | Jane |
|  | Project Z | Albert |
| Widget | Project A | Eleanor |
|  | Project X | Theresa |

Edit tool 404 allows the user to edit multiple terms and to create multiple links between terms and projects (e.g., using multiple selections via checkboxes) at a time. In addition, when the user initiates his or her user session, edit tool 404 may present the user with a cascading drop-down list of product/group/project. That is, when the user selects a particular product in a drop-down list of products, edit tool 404 presents the user with a drop-down list of groups included in the selected product. When the user selects a particular group in the drop-down list of groups, edit tool 404 presents the user with a drop-down list of projects included in the selected group.

Edit tool 404 further allows the user to delete a term stored in central database 202. When the user deletes a normal term (as opposed to a See Other term) from a project, the term's See Other and See Also pointers are automatically removed from the project as well. Before performing the deletion, edit tool 404 prompts the user to verify the deletion by presenting a message dialog that specifies one or more links affected by the deletion. There are several ways that the user may delete a term via edit tool 404. For example, the user may unlink a term from a project by deselecting the project in the Projects tab of edit tool 404. Alternatively, the user may delete a term by selecting the term in a glossary list UI and choosing a Delete option.

Terminology Management

Figure 7:
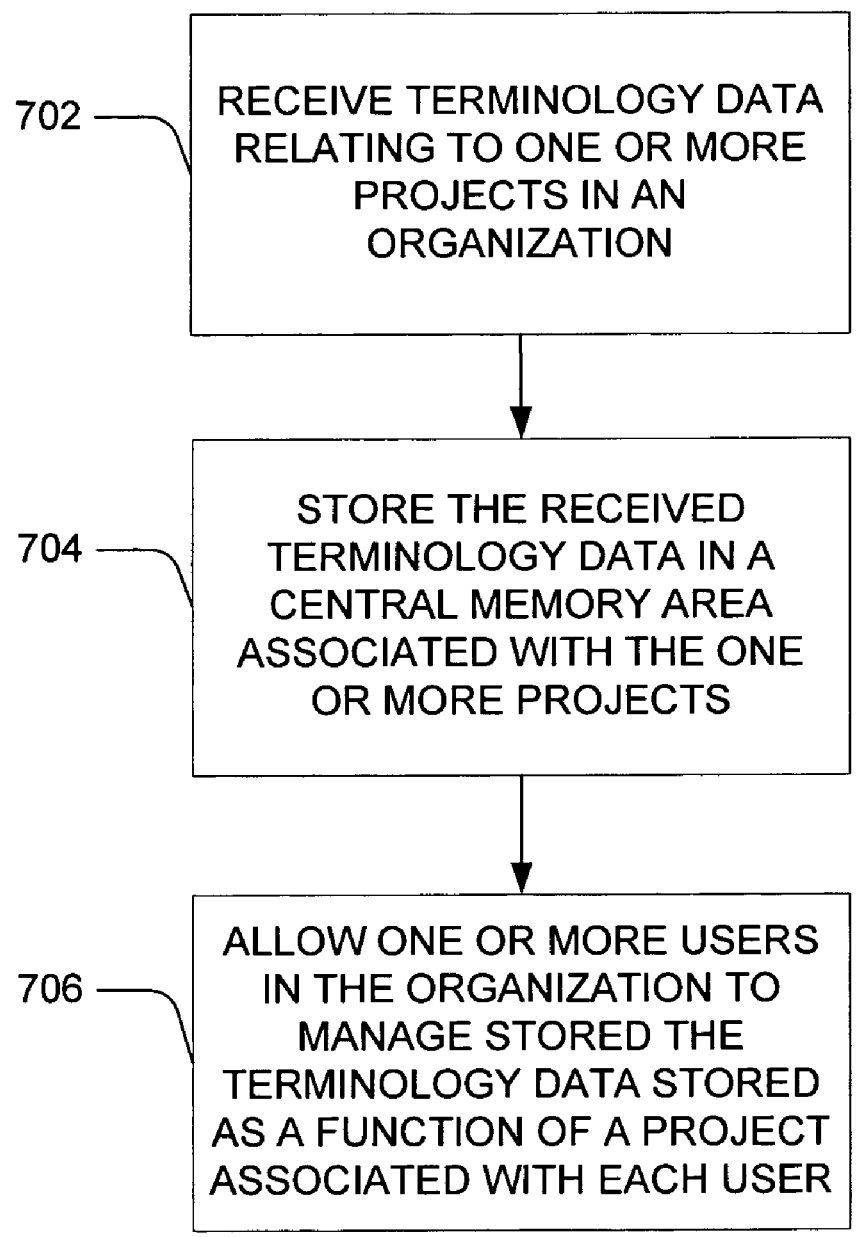
FIG. 7 is an exemplary flow diagram illustrating process flow according to one embodiment of the invention for managing terminology in an organization.

FIG. 7 illustrates an exemplary process flow for managing terminology in an organization according to one embodiment of the invention. At 702, terminology data relating to one or more projects in the organization is received, for example, at a local memory area associated with a particular project in the organization. The terminology data may include data describing a new term in the organization or an update to an existing term in the organization. The terminology data may also specify a relationship among a term, a project, a group, and a product of the organization. The terminology data may further include a See Other reference for the term, a See Also reference for the term, and/or a Part of Speech of the term.

At 704, the received terminology data is stored in a central memory area such as central database 202. The central memory area is associated with the one or more projects in the organization. At 706, one or more users in the organization are allowed to manage the terminology data stored in the central memory area as a function of a project associated with each user. For example, the users may search for a term stored in the central memory area, export the terminology data stored in the central memory area, and/or generate a report based on the stored terminology data. In an embodiment of the invention, the users are allowed to manage the stored terminology data as a function of a defined relationship between each user and the projects associated with the central memory area. The defined relationship identifies each user's permission setting with respect to each project. The defined relationship may further identify various account types, which describe various users' permission settings. Each user is also allowed to select a project specified in the central memory area. In response to the user selecting the specified project, a list of terms associated with the specified project is provided to the user. A list of other projects associated with each of the provided list of terms is also provided to allow the user to effectively manage terminology data. The user is further allowed to choose a term stored in the central memory area for deletion. If the term includes a See Other reference and/or a See Also reference, the user is then informed that the term is subject to a See Other pointer and/or a See Also pointer. If the user confirms the deletion of the term, the See Other pointer and/or the See Also pointer are then automatically removed. The user is further allowed to localize a term (e.g., in another language or culture) external to the central memory area based on the terminology data stored in the central memory area.

In another embodiment of the invention, a user is provided glossary history data that identifies one or more updates to a term entry stored in the central memory area. The user may then manually change the stored term entry based on the provided glossary history data (e.g., rolling back or rolling forward the stored term entry). The user may also be provided with project history data that identifies one or more updates to a project specified in the central memory area, group history data that identifies one or more updates to a group specified in the central memory area, and product history data that identifies one or more updates to a product specified in the central memory area.

In yet another embodiment of the invention, users are automatically notified (e.g., via an e-mail) of one or more of the following: a term stored in the central memory area has been edited, a new term has been stored in the central memory area, a term has been linked with a project specified in the central memory area, a term stored in the central memory area has not been associated with a project, and a new term that is duplicative of an existing term already stored in the central memory area has been stored in the central memory area. This notification may be deferred according to a user-specified option.

Terminology Development

Figure 8:
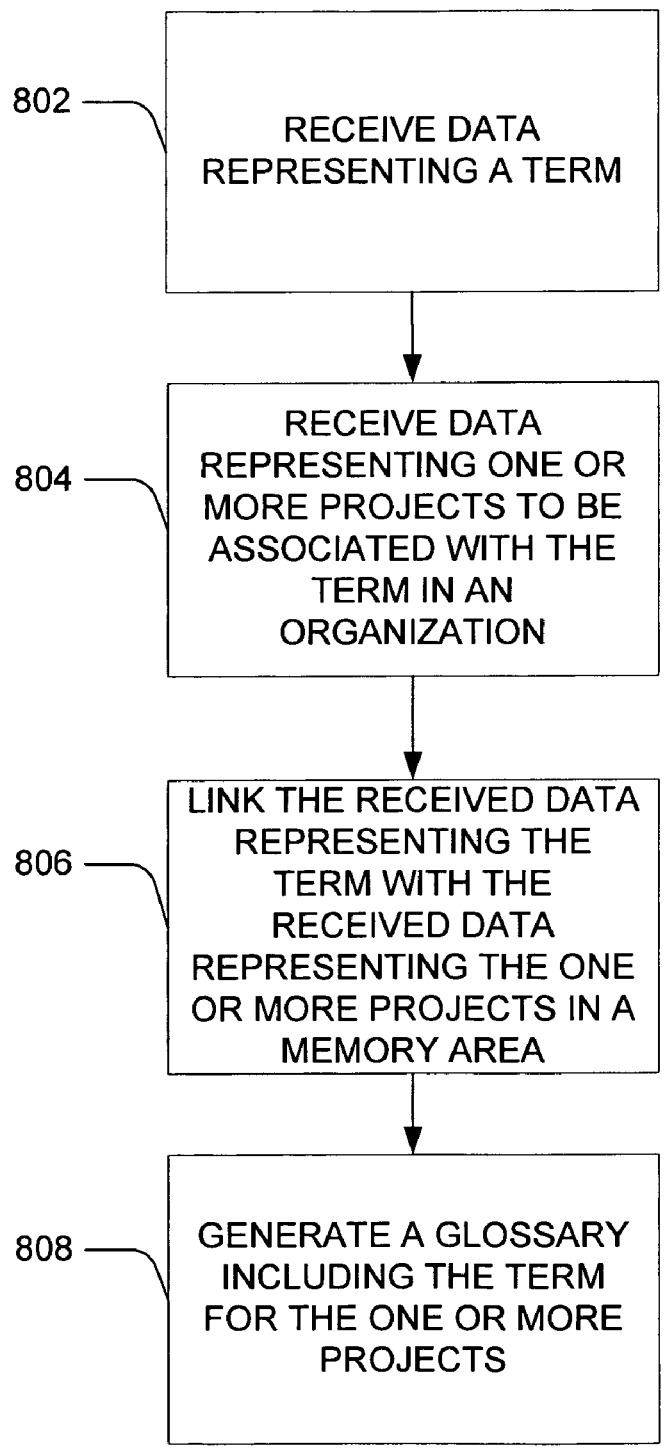
FIG. 8 is an exemplary flow diagram illustrating process flow according to one embodiment of the invention for developing terminology in an organization.

FIG. 8 illustrates an exemplary process flow for developing terminology in an organization according to one embodiment of the invention. At 802, data representing a term is received. For example, a user in the organization may be allowed access to a memory area to search for and select a particular term (e.g., based on a project name). An indication from the user that the term is selected is then received to gather data regarding the term. At 804, data representing one or more projects to be associated with the term in the organization is received. In an embodiment of the invention, data representing a definition of the term is also received to associate the definition with the term. Moreover, data representing a comment for the term may be received to allow the user to localize the term based on the comments. In addition, reference data representing a See Other reference for the term and/or a See Also reference for the term may be received to allow linking of the reference data with the data representing the term.

At 806, the received data representing the term is linked with the received data representing the one or more projects in a memory area. For instance, the received data representing the term is stored in a first database table in the memory area, and the received data representing the one or more projects is stored in a second database table in the memory area. An intermediary database table in the memory area may then be used to associate the first database table with the second database table to provide such data linking.

At 808, a glossary including the term is generated for the one or more projects. A help file (e.g., in CHM) may also be generated based on the received data representing the term and the received data representing the one or more projects. A user in the organization is allowed to approve the term for the one or more projects in response to linking the data representing the term with the data representing the one or more projects. Particularly, the user is allowed to approve the term for the one or more projects as a function of the user's permission setting with regard to each of the projects.

Exemplary Computer-Readable Medium

Figure 9:
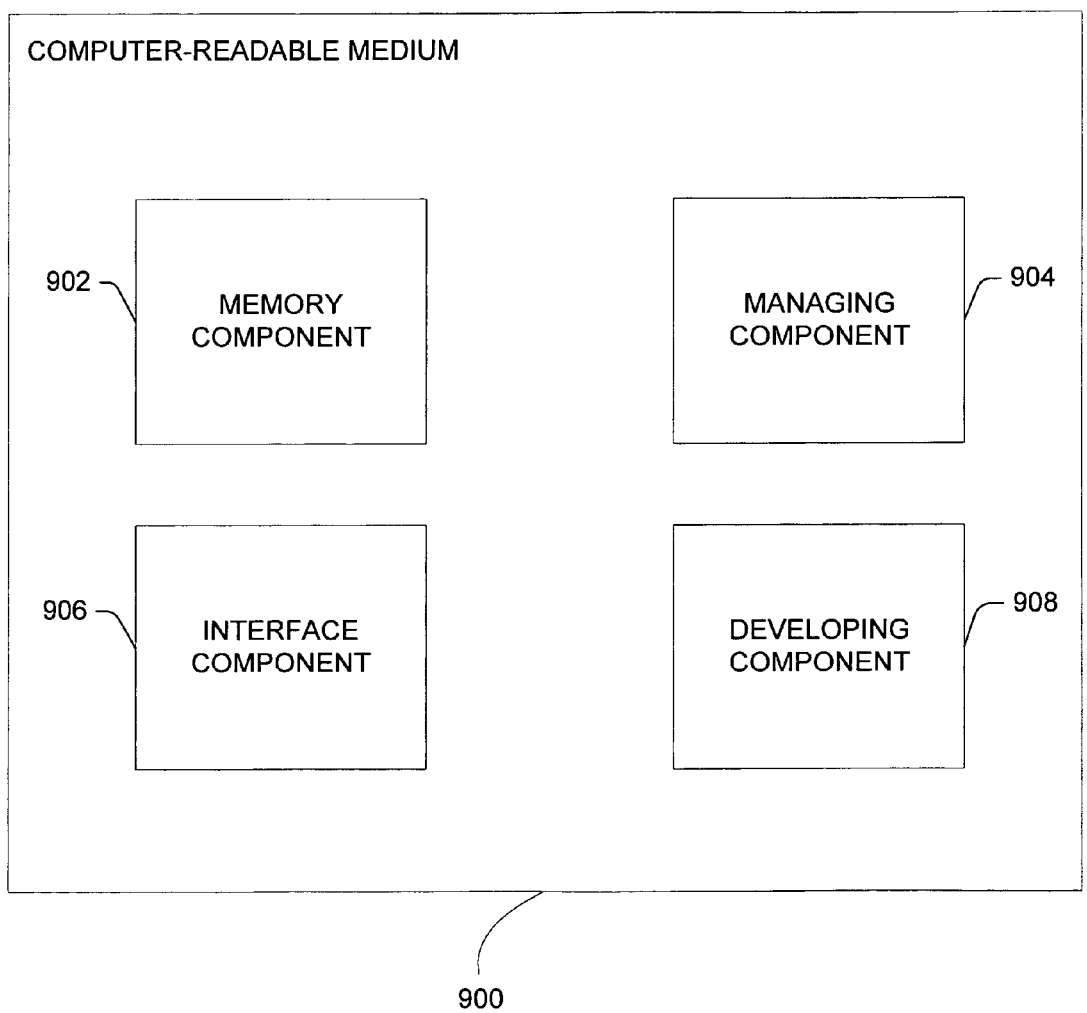
FIG. 9 is a block diagram illustrating another exemplary computer-readable medium according to one embodiment of the invention.

FIG. 9 is a block diagram illustrating an exemplary computer-readable medium 900 having computer-executable components according to one embodiment of the invention. As shown, the computer-readable medium 900 includes computer-executable components such as a memory component 902, a managing component 904, an interface component 906, and a developing component 908. However, it is contemplated that computer-readable medium 900 may be any quantity of computer readable media and may comprise various combinations of components and functionalities associated with each component.

The memory component 902 is associated with a plurality of projects in an organization for receiving one or more terms related to the plurality of projects from one or more users. Memory component 902 is accessible by the one or more users and is configured to store the one or more terms. Memory component 902 may be a relational database (e.g., a SQL database) that generally stores terminology data related to the organization. Moreover, memory component 902 stores data that defines a relationship among a term, a project, a group, and a product of the organization.

The managing component 904 allows one or more users in the organization to access memory component 902 according to a permissions structure for managing one or more terms stored in memory component 902 as a function of a project associated with each user. In particular, managing component 904 allows one or more users to manage the terms based on an account type associated with each user. In an embodiment of the invention, managing component 904 accesses memory component 902 to provide glossary history data to a user. The glossary history data identifies one or more updates to a particular term stored in memory component 902 to allow the user to manually change the term entry based on the glossary history data (e.g., rolling back or rolling forward the term entry). In another embodiment, managing component 904 is configured to notify other users in the organization in response to the user performing one or more of the following: editing a term stored in memory component 902, storing a new term in memory component 902, storing in memory component 902 a term that has not been associated with a project, and storing in memory component 902 a new term that is duplicative of an existing term already stored in memory component 902.

The interface component 906 is configured to receive data representing a term from a user and data representing a project to be associated with the term in the organization from the user. The developing component 908 is configured to link the received data representing the term with the received data representing the project in memory component 902. Developing component 908 further generates a glossary including the term for the project. In an embodiment of the invention, interface component 906 further receives data representing a definition of the term. Developing component 908 is then configured to associate the definition with the term in memory component 902.

Developing component 908 further allows the use to access memory component 902 to search for a particular term. Moreover, developing component 908 may generate a help file (e.g., in CHM) based on the data representing the term and the data representing the project. Developing component 908 is also configured to link reference data representing a See Other reference and/or a See Also reference with the data representing the term in memory component 902. In another embodiment of the invention, developing component 908 is further configured to allow the user to approve the term for the project in response to linking the data representing the term with the data representing the project. Developing component 908 may also store the data representing the term in a first database table in memory component 902, store the data representing the project in a second database table in memory component 902, and associate the first database table with the second database table via an intermediary database table in memory component 902.

Exemplary Operating Environment

Figure 10:
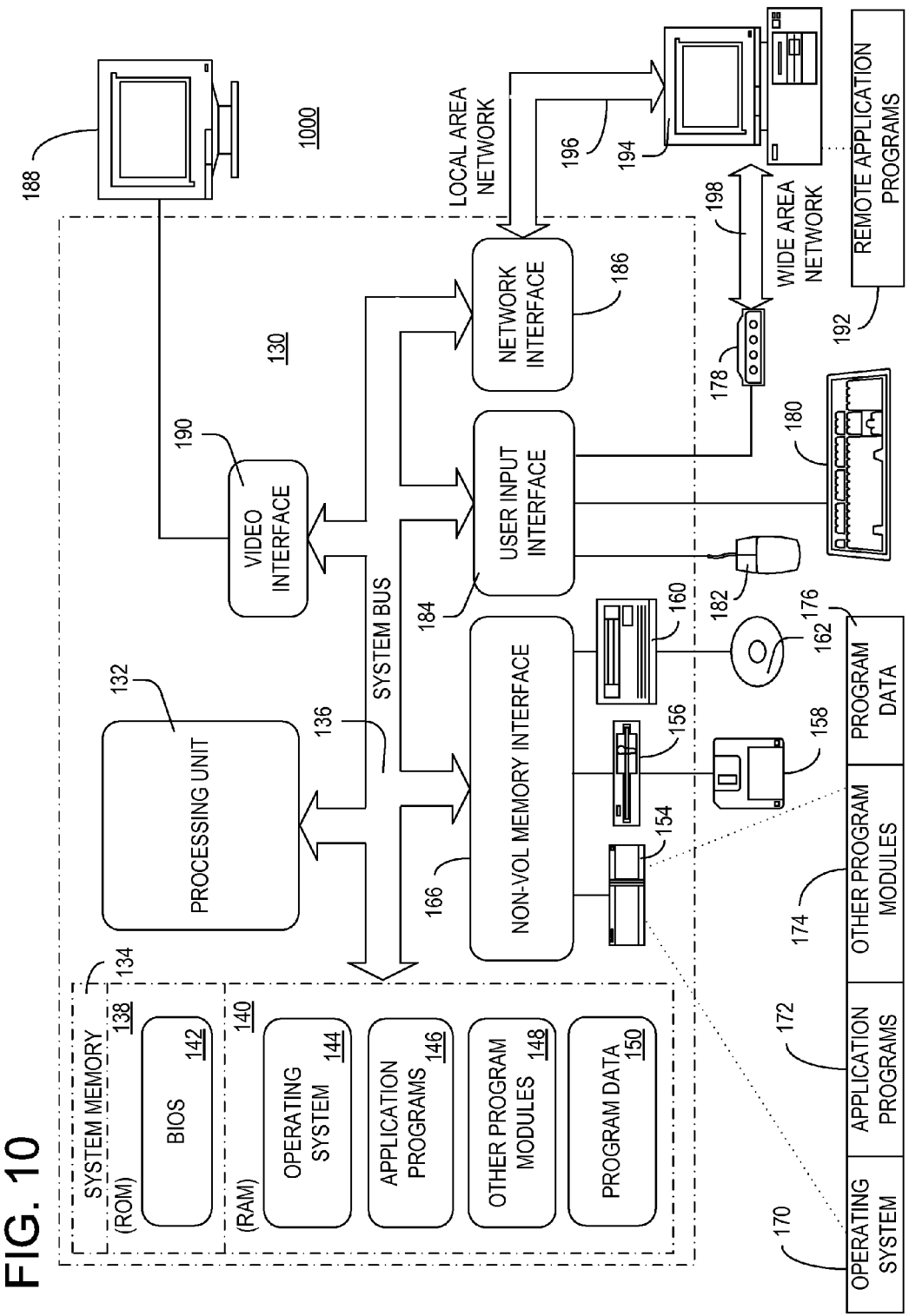
FIG. 10 is a block diagram illustrating an exemplary embodiment of a suitable computing system environment in which one embodiment of the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to manage terminology among multiple users. Computer-executable instructions are configured to receive terminology data from one or more users. The terminology data relates to one or more projects in an organization. Computer-executable instructions are also configured to store the received terminology data in a central memory area associated with the one or more projects. The central memory area is accessible by one or more of the users. Computer-executable instructions are further configured to allow the one or more users to access and use the terminology data stored in the central memory area according to a permissions structure for managing the stored terminology data as a function of a project associated with each user.

In another embodiment, computer-executable instructions are configured to receive data relating to a first term from a first user. Computer-executable instructions are configured to store the received data relating to the first term in a first memory area. The first memory area is associated with the first user. Computer-executable instructions are also configured to receive data relating to a second term from a second user. Computer-executable instructions are configured to store the received data relating to the second term in a second memory area. The second memory area is associated with the second user. Computer-executable instructions are further configured to store the data relating to the first term in a central memory area in response to storing the data relating to the first term in the first memory area. Computer-executable instructions are also configured to store the data relating to the second term in the central memory area in response to storing the data relating to the second term in the second memory area. Computer-executable instructions are configured to allow the first user and the second user access to the central memory area to manage the first and second terms.

Computer 130 also executes computer-executable instructions such as those described herein to develop terminology for use within an organization. Computer-executable instructions are configured to receive data representing a term from a user. Computer-executable instructions are configured to receive data representing one or more projects to be associated with the term in the organization from the user. Computer-executable instructions are also configured to link the received data representing the term with the received data representing the one or more projects in a memory area. Computer-executable instructions are further configured to generate a glossary for the one or more projects. The generated glossary includes the term.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX A

APPENDIX A provides an exemplary implementation of user permissions regarding terminology and glossary data according to one embodiment of the invention.

In an embodiment of the invention, users within an organization automatically have guest permissions on projects specified in a central database. To perform an editing operation, a user may be granted specific permissions for one or more projects. In the central database, the user is assigned to a project by inserting a record in an intermediary table named InkUser_Project. The user may be granted a specific permission by associating the InkUser_Project record with an account type. The user inherits the permission that is associated with the account type. Optionally, the user may be granted additional permissions that apply specific to the user and the project.

One embodiment of the invention implements permissions by using a set of integer values. When integer values are combined, a bit mask is created that indicates one or more specific permissions that have been granted to a user. One embodiment of the invention then uses a bitwise comparison to determine if the user has an appropriate permission to execute a given action. Table 7 provides exemplary permissions and their bit mask values according to one embodiment of the invention.

TABLE 7

Exemplary Permissions and Bit Mask Values

| Bit Mask | Permissions Name | Description |
|---|---|---|
| 0 | ALLOW_GUEST | Guest permission |
| 1 | ALLOW_INSERT | Insert a new term |
| 2 | ALLOW_EDIT | Edit an existing term |
| 4 | ALLOW_DELETE | Delete an existing terms |
| 8 | ALLOW_ADMIN_AREA | Basic Admin permission |
| 16 | EDIT_GLOSSARY_LINKS | Define See Also and See Other links, Link a glossary to a project |
| 32 | APPROVE_TERMS | Approve or disapprove a term |
| 64 | CREATE_PROJECT | Create a new project |
| 128 | CREATE_GROUP | Create a new group |
| 256 | CREATE_PRODUCT | Create a new product |
| 512 | MANAGE_USER_PROJECTS | Link a user to a project |
| 1024 | MANAGE_USERS | Manage user records |
| 2048 | MANAGE_GROUP | Manage associated projects and project links, edit a project |
| 4096 | MANAGE_PROJADMINS | Manage project administrators for a group |
| 8192 | MANAGE_PRODUCT | Manage associated groups and projects, edit a product |
| 16384 | MANAGE_GROUPADMINS | Manage all group administrators for a product |
| 32768 | MANAGE_PRODADMINS | Manage all product administrators |
| 65536 | CTS | Allowed to archive projects. |
| 131072 | CLONE_PROJECTS | Allowed to clone projects to create new projects |
| 262144 | BULK_EDIT_PROJECTS | Allowed to perform bulk-edit operations on projects |
| 524288 | MANAGE_GLOBAL | Allowed to perform limited administrative tasks on a global scope |

When the user accesses or instantiates a developing environment, an embodiment of the invention execute the following steps:

Detecting the user's login name via an authentication system.

Determining a selected product, group, and project based on the user's settings or on attributes within the developing environment.

Fetching the user's permissions from the central database.

Performing a bitwise comparison against the user's permissions to determine if he or she may perform an edit action.

Selectively parsing (or not parsing) various UI elements to a client browser based on a result of the bitwise comparison if the user loads a webpage.

The formula for performing a bitwise comparison is as follows: value A (a requested permission) is compared against value B (the user's permission bit mask) to see if value B includes value A. For example, if the user's permission bit mask value is 19. To determine if the user has an edit permission for a given project, an embodiment of the invention compares the ALLOW_EDIT bit mask (2) against the user's permission bit mask value (19). A bitwise comparison is true if a result of the comparison equals the requested value. Thus, the SQL syntax may be:

Select@bOK=((19 & 2)=2)

In this example, the result would be true since the bit mask value of 19 includes 1 (ALLOW_INSERT), 2 (ALLOW_EDIT), and 16 (EDIT_GLOSSARY_LINKS). Therefore, the user has the edit permission for the project.

Embodiments of the invention manage user permissions via account types, which are essentially user groups. A standard set of permissions is associated with each account type. When an administrator adds a user to a project, he or she sets the user's account type such that the user automatically inherits an appropriate set of standard permissions. As described, exemplary account types include guests, authors, editors, project administrators, and system administrators.

The administrator may grant optional permissions to the users based on the user's account type. For example, the administrator may add a user to a particular project. The administrator sets the user as an author, which automatically grants the user permissions to insert a term and to edit a glossary link. In addition to the standard permissions inherited from the "author" account type, the administrator may grant the user optional permissions to edit and approve a term. Regardless, as an author, the user has at least the standard author-level access to the project.

Accordingly, embodiments of the invention divide permissions into two categories: standard and optional. For standard permissions, with the exception of system administrators, who do not have explicit permissions, each account type is associated with one or more permissions by linking the account type with various permission records. Embodiments of the invention performs the linking by adding a record in an intermediary table named sysTbl_AcctPermissions and associating the account type with a permission record specified in this intermediary table. For each granted permission, a flag is set in the is Optional entry of the table sysTbl_AcctPermissions to indicate the permission as either standard or optional. Users who are associated with this account type automatically have standard permissions associated with the account type.

Values for optional permissions are stored as a bit mask in an iPermissions entry of the table InkUser_Project associated with a user. The user's standard permissions are not stored in this table because he or she inherits these permissions from an account type record specified in a table named sysTbl_AcctTypes. Thus, standard permissions are granted to an account type while optional permissions are granted to a specific user.

To illustrate, an administrator may grant a user, who already is an author for a project, an optional permission to edit a term. The value of this optional permission (2) is stored in the iPermissions entry of the table InkUser_Project associated with the user. When the user accesses or instantiates a developing environment and visits the project, his or her permissions are calculated as follows: The sum of the standard permissions granted to the user's account type (author):

|   |   |
|---|---|
| 1 | ALLOW_INSERT |
| + | |
| 16 | EDIT_GLOSSARY_LINKS |
| = | |
| 17 | Standard Permissions Total | plus the optional permissions stored in the iPermissions entry of the table InkUser_Project associated with the user:

|   |   |
|---|---|
| 17 | Standard Permissions Total |
| + | |
| 2 | ALLOW_EDIT |
| = | |
| 19 | Total User Permissions for the Project |

To expose one or more functionalities that the user has been granted permissions for, embodiments of the invention then use the total user permissions value to perform a permission check (e.g., via a bitwise comparison).

What is claimed is:

1. A method of developing terminology for use within an organization, said method comprising:
    receiving data representing a term for building a glossary from a user;
    receiving data representing one or more projects to be associated with the term in the organization from the user;
    receiving data representing a definition associated with the data representing the term used in association with the one or more projects;
    defining a relationship between the received data representing the term and the received data representing the one or more projects, said relationship defining at least one of the following: a project may include zero to many terms, a term may appear in zero to many projects, and a term may not appear in the same project more than once;
    linking the received data representing the term with the received data representing the one or more projects in a central memory area accessible by a computing device;
    automatically extracting the received data representing the definition associated with the data representing the term; and
    automatically generating the glossary for the one or more projects, said generated glossary including the term having the extracted definition linked to the one or more projects provided from the user.

2. The method of claim 1 wherein receiving the data representing the term comprises:
    allowing a user in the organization to access the memory area to search for and select the term,
    receiving an indication from the user that the term is selected.

3. The method of claim 2 wherein allowing the user in the organization to search for and select the term comprises allowing the user to search for the term based on a project name.

4. The method of claim 1 further comprising generating a help file based on the received data representing the term and the received data representing the one or more projects.

5. The method of claim 4 wherein generating the help file comprises outputting data in compiled hypertext markup language help format (CHM).

6. The method of claim 1 further comprising receiving data representing a comment for the term to allow a user in the organization to localize the term based on the comment.

7. The method of claim 1 further comprising:
    receiving reference data representing one or more of the following: a See Other reference for the term and a See Also reference for the term, and
    linking the received reference data with the received data representing the term in the memory area.

8. The method of claim 1 further comprising allowing a user in the organization to approve the term for the one or more projects in response to linking the received data representing the term with the received data representing the one or more projects in the memory area.

9. The method of claim 8 wherein allowing the user to approve the term for the one or more projects comprises allowing the user to approve the term for the one or more projects as a function of a permission setting of the user with regard to each of the one or more projects.

10. The method of claim 1 further comprising allowing a user to manage the received data representing the term and the received data representing the one or more projects as a function of a project associated with the user.

11. The method of claim 1 further comprising:
storing the received data representing the term in a first database table in the memory area,
storing the received data representing the one or more projects in a second database table in the memory area, and
wherein linking the received data representing the term with the received data representing the one or more projects comprises using an intermediary database table in the memory area to associate the first database table with the second database table.

12. The method of claim 1 wherein one or more computer storage media have computer-executable instructions to perform the method recited in claim 1.

13. A system for developing terminology for use within an organization, said system comprising:
a memory area for storing terminology data related to the organization; and
a processor configured to execute computer-executable instructions to:
receive data representing a term for building a glossary of terms from a user,
receive data representing a project to be associated with the term in the organization from the user, said term representing a terminology used in association with the one or more projects, said terminology associating with at least a definition included in the terminology data stored in the memory area,
define a relationship between the received data representing the term and the received data representing the one or more projects, said relationship defining at least one of the following: a project may include zero to many terms, a term may appear in zero to many projects, and a term may not appear in the same project more than once,
link the received data representing the term and the received data representing the project in the memory area,
automatically extract the definition associated with the data representing the term from the terminology data in the memory area; and
automatically generate a glossary including the term for the project, said generated glossary including the term having the extracted definition linked to the one or more projects provided from the user.

14. The system of claim 13 wherein the memory area is a relational database.

15. The system of claim 13 further comprising an interface configured to allow a user in the organization to manage the terminology data stored in the memory area.

16. The system of claim 13 wherein the processor is configured to execute computer-executable instructions to receive data representing a definition of the term and to associate the definition with the term.

17. The system of claim 13 wherein the processor is configured to execute computer-executable instructions to allow a user in the organization to access the memory area to search for the term based on a project name.

18. The system of claim 13 wherein the processor is configured to execute computer-executable instructions to generate a help file based on the received data representing the term and the received data representing the project.

19. The system of claim 13 wherein the processor is configured to execute computer-executable instructions to receive data representing a comment for the term to allow a user in the organization to localize the term based on the comment.

20. The system of claim 13 wherein the processor is configured to execute computer-executable instructions to receive reference data representing one or more of the following: a See Other reference for the term and a See Also reference for the term, said processor further being configured to execute computer-executable instructions to link the received reference data with the received data representing the term in the memory area.

21. The system of claim 13 wherein the processor is configured to execute computer-executable instructions to allow a user in the organization to approve the term for the project in response to linking the received data representing the term with the received data representing the project in the memory area.

22. The system of claim 13 wherein the processor is configured to execute computer-executable instructions to:
store the received data representing the term in a first database table in the memory area,
store the received data representing the project in a second database table in the memory area, and
associate the first database table and the second database table via an intermediary database table in the memory area.

23. One or more computer storage media having computer-executable components for developing terminology for use within an organization, said computer storage media comprising:
a memory component for storing terminology data related to the organization;
an interface component for receiving data representing a term for building a glossary of terms from a user and for receiving data representing a project to be associated with the term in the organization from the user, said term being used in association with the one or more projects and being associated with at least a definition included in the terminology data stored in the memory area; and
a developing component for linking the received data representing the term with the received data representing the project in the memory component, for automatically extracting the definition associated with the term from the terminology data in the memory area, and for automatically generating a glossary for the project, said generated glossary including the term having the extracted definition linked to the one or more projects from the user, wherein a relationship is defined between the received data representing the term and the received data representing the one or more projects in the terminology data, said relationship defining at least one of the following: a project may include zero to many terms, a term may appear in zero to many projects, and a term may not appear in the same project more than once.

24. The computer storage media of claim 23 wherein the interface component is configured to receive data representing a definition of the term, and wherein the developing component is configured to associate the definition with the term.

25. The computer storage media of claim 23 wherein the developing component includes a lookup tool, said lookup tool being configured to allow a user in the organization to access the memory component to search for the term.

26. The computer storage media of claim 23 wherein the developing component includes a build process, said build process being configured to generate a help file based on the received data representing the term and the received data representing the project.

27. The computer storage media of claim 26 wherein the help file is in compiled hypertext markup language help format (CHM).

28. The computer storage media of claim 23 wherein the developing component includes an edit tool, said edit tool being configured to link reference data with the received data representing the term in the memory component, said reference data representing one or more of the following: a See Other reference for the term and a See Also reference for the term.

29. The computer storage media of claim 23 wherein the developing component includes an edit tool, said edit tool being configured to allow a user in the organization to approve the term for the project in response to linking the received data representing the term with the received data representing the project in the memory component.

30. The computer storage media of claim 23 wherein the developing component is configured to:
 store the received data representing the term in a first database table in the memory component,
 store the received data representing the project in a second database table in the memory component, and
 associate the first database table with the second database table via an intermediary database table in the memory component.

31. The computer storage media of claim 23 wherein the memory component is a structured query language (SQL) database.

* * * * *

UNITED STATES PATENT AND TRADEMARK OFFICE
CERTIFICATE OF CORRECTION

PATENT NO. : 7,617,232 B2
APPLICATION NO. : 10/933187
DATED : November 10, 2009
INVENTOR(S) : Gabbert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Nineteenth Day of October, 2010

David J. Kappos
*Director of the United States Patent and Trademark Office*